United States Patent [19]

Fischer

[11] Patent Number: 5,494,233

[45] Date of Patent: Feb. 27, 1996

[54] RECORDING AND/OR REPRODUCING APPARATUS COMPRISING A CHASSIS AND APPARATUS PARTS ARRANGED ON SAID CHASSIS

[75] Inventor: Karl Fischer, Perchtoldsdorf, Austria

[73] Assignee: U.S. Philips Corporation, New York, N.Y.

[21] Appl. No.: 173,546

[22] Filed: Dec. 23, 1993

[30] Foreign Application Priority Data

Feb. 11, 1993 [AT] Austria .................................. 249/93

[51] Int. Cl.⁶ .................................................. G11B 15/10
[52] U.S. Cl. .................................................... 242/356.4
[58] Field of Search .............................. 242/352, 352.5, 242/356, 356.3, 356.4; 360/96.1, 96.3, 96.5

[56] References Cited

U.S. PATENT DOCUMENTS

| | | |
|---|---|---|
| 3,373,951 | 3/1968 | Mazoyer . |
| 3,877,074 | 4/1975 | Güttinger ................................. 360/96 |
| 4,206,488 | 6/1980 | Nakayama et al. ..................... 360/96.1 |
| 4,531,168 | 7/1985 | Suzuki ..................................... 360/96.1 |
| 4,962,436 | 10/1990 | Bayer et al. ............................ 360/96.3 |
| 4,964,589 | 10/1990 | Okada ................................. 360/96.3 X |
| 5,211,066 | 5/1993 | Koga et al. ......................... 360/96.3 X |
| 5,373,405 | 12/1994 | Fischer ................................... 360/96.5 |

*Primary Examiner*—John P. Darling
*Attorney, Agent, or Firm*—Brian J. Wieghaus

[57] ABSTRACT

In a recording and/or reproducing apparatus (1; 1') with an apparatus housing (2; 2') and a chassis (43; 43') arranged therein and carrying at least one movable apparatus part (37, 37', 60, 60', 61, 61', 67, 67', 69, 69', 75, 75', 108, 108', 111, 111', 112, 112', 113, 113') at least one movable control device (70, 70'; 86, 86'), which is pivotable about a spindle (47, 47', 48, 48') has been provided to control the movement of least one movable apparatus part, which control device is coupled to a movable actuating device (80, 80', 103, 103') via a coupling device (79, 79', 102, 102'), which actuating device can be coupled to the control device (70, 70', 86, 86') in a given position relative to the chassis (43, 43') and is connected to a hand-actuated actuating member (17, 17', 18, 18'). For the construction of two apparatus variants which differ as regards the arrangement of the chassis (43, 43') in the apparatus housing (2, 2') the control device (70, 70', 86, 86') comprises two coupling elements (81, 81', 104, 104') which are spaced apart by a given angle, and one of two actuating devices (80, 80', 103, 103') is engageable with each of these coupling elements of the control device (70, 70', 86, 86'), of which one actuating device (80, 103) can be coupled to the control device (70, 86 and 70', 86', respectively) in one given position relative to the chassis (43) and the other actuating device (80', 103') can be coupled to said control device in a second given position relative to the chassis (43').

30 Claims, 3 Drawing Sheets

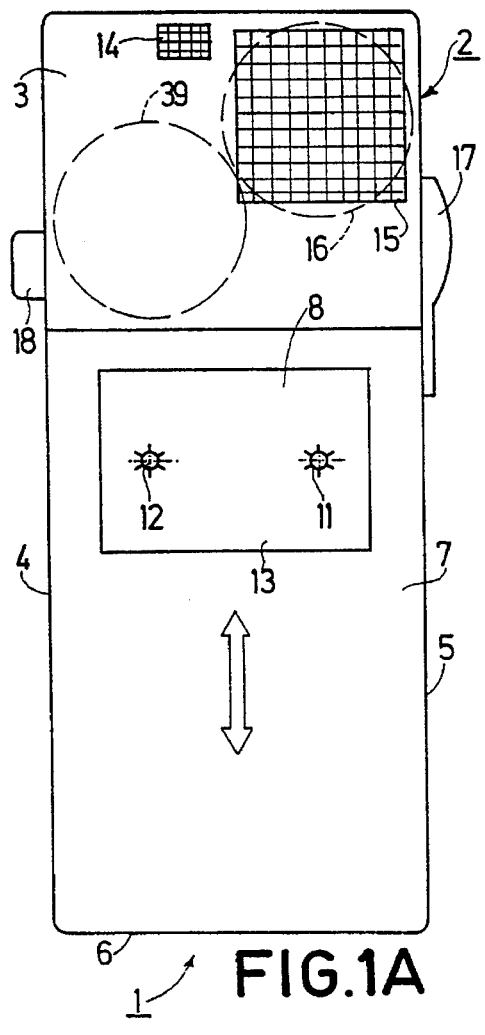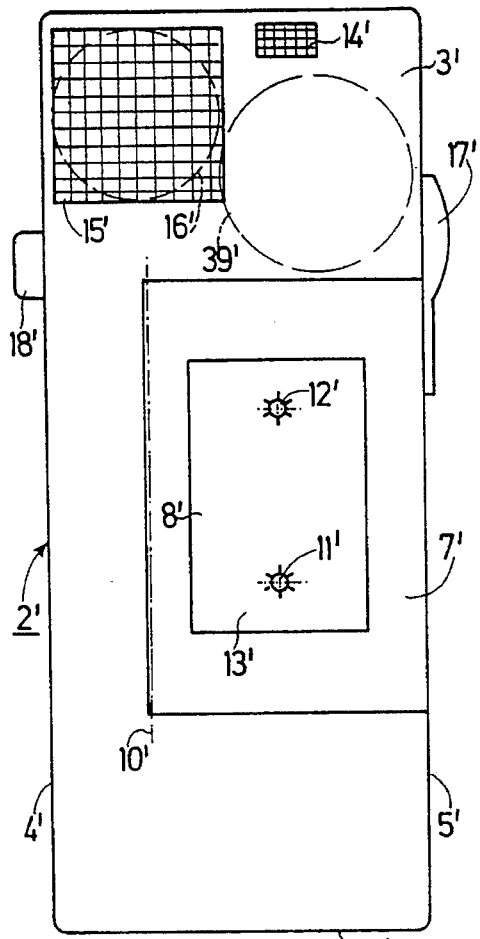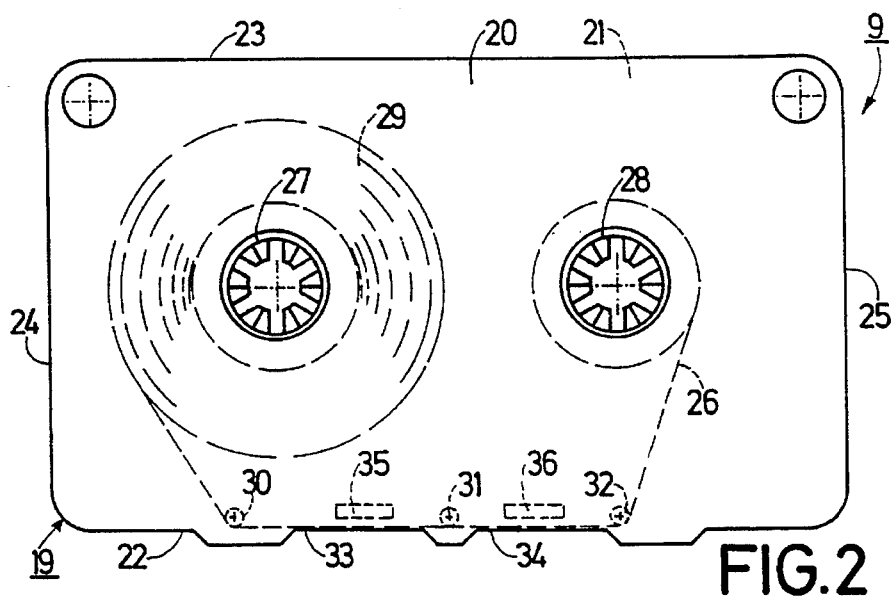

RECORDING AND/OR REPRODUCING APPARATUS COMPRISING A CHASSIS AND APPARATUS PARTS ARRANGED ON SAID CHASSIS

BACKGROUND OF THE INVENTION

The invention relates to a recording and/or reproducing apparatus comprising an apparatus housing, a chassis arranged inside the apparatus housing, apparatus parts arranged on the chassis and including at least one apparatus part arranged on the chassis so as to be movable, and at least one control device provided to control the movement of least one apparatus part arranged on the chassis so as to be movable, which at least one control device is mounted so as to be pivotable about a spindle, is movable between at least two operating positions relative to the chassis and the apparatus parts arranged thereon, and is coupled to a movable actuating device via a coupling device, which actuating device can be coupled to the control device via the coupling device in a given position relative to the chassis and the apparatus parts arranged thereon, and which is connected to a hand-actuated actuating member of the apparatus, which member is disposed at least partly outside the apparatus housing, the coupling device comprising a coupling element on the control device and on actuating device.

Such an apparatus of the type defined in the opening paragraph is known, for example, from AT 390,153 B. This known apparatus is a dictation machine for recording and reproducing dictations, which is hand-held in operation and which has a narrow slender rectangular apparatus housing. The device receives a cassette containing a magnetic tape and accommodating two rotatable reel hubs for taking up the magnetic tape, i.e. one forward reel hub and one reverse reel hub. A chassis of this known apparatus carries a pivotably mounted bearing block which rotatably supports a drive shaft and a toothed wheel, which is coaxial with and locked in rotation to the drive shaft. The drive shaft comprises a friction-wheel drive portion for driving a forward-winding-mandrel wheel which is coaxial with a forward winding mandrel, which can be brought into driving engagement with the forward reel hub in a cassette. The toothed wheel which is coaxial with and locked in rotation to the drive shaft serves for driving a reverse-winding-mandrel wheel which is rotatably supported on the chassis and which is coaxial with a reverse winding mandrel, which can be brought into driving engagement with the reverse reel hub in a cassette. To control the actuation of the bearing block together with the drive shaft and the toothed wheel on this shaft the known apparatus has a control device comprising a spring-loaded two-arm control lever, which is supported so as to be pivotable about a spindle on the chassis, the bearing block being coupled to one of the lever arms of this lever. The free end of the other lever arm of the control lever forms a coupling element of a coupling device which couples the control lever to an actuating device. In the present case the actuating device is formed by an actuating slide which extends substantially rectilinearly along a longitudinal side wall of the apparatus housing, which slide has one of its two ends connected to a slide button, which forms an actuating member and which is slidable along said longitudinal side wall, through a passage in this longitudinal side wall and whose other end forms a further coupling element of said coupling device to couple the actuating device and the control device.

In this known apparatus the arrangement of the chassis and the apparatus parts mounted on the chassis in relation to the apparatus housing has been selected in such a manner that a connecting line between the two winding mandrels, which are rotatably supported on the chassis, extends parallel to the longitudinal direction of the narrow slender rectangular apparatus housing, said actuating member being situated on said longitudinal side wall of the apparatus housing. Thus, in the known apparatus the chassis and the parts mounted thereon, on the one hand, and the actuating member, on the other hand, occupy a certain position relative to one another, which position is dictated by the arrangement of the chassis in the apparatus housing and cannot be changed.

SUMMARY OF THE INVENTION

It is an object of the invention to provide an apparatus of the type defined in the opening paragraph, which enables two variants of the apparatus to be realized which differ as regards the position of the chassis and the apparatus parts mounted thereon and which use the same chassis and the same apparatus parts, the actuating members for controlling the apparatus functions and for actuating the movable apparatus parts occupying substantially the same locations on the apparatus housings of the two variants of the apparatus.

To this end, the invention is characterized in that the control device comprises two coupling elements which are spaced apart by a given angle relative to the spindle, and one of two actuating devices is engageable with each coupling element of the control device, of which one actuating device can be coupled to the control device in one given position relative to the chassis and the apparatus parts arranged on the chassis and the other actuating device can be coupled to the control device in a position rotated through the given angle with respect to the given position relative to the chassis and the apparatus parts arranged on the chassis. In this way it is achieved that one and the same chassis together with the apparatus parts arranged on it can be built into an apparatus housing in two positions rotated relative to one another through the given angle in order to realize two variants of the apparatus which differ from one another with respect to the position of the chassis and the apparatus parts mounted thereon, and in spite of the different apparatus variants the actuating members are disposed on the relevant apparatus housings at substantially the same ergonomically advantageous locations. The actuating members are coupled to the control device of the relevant apparatus via a coupling device by means of actuating devices which differ only slightly depending on the apparatus variant.

It has proved to be advantageous if the two coupling elements of the control device are spaced apart at substantially 90° relative to the spindle. In this way it is possible to realize those apparatus variants which are most frequently desired in practice.

It is also favorable if the coupling elements of the control device are formed by apertures in the control device, which apertures are engageable by pins projecting from the actuating devices and forming the coupling elements of said actuating devices. This is advantageous for a very simple and reliable construction of the coupling device.

It has also proved to be advantageous if the coupling elements of the control device are formed by pins which project from said control device and which are engageable in apertures provided in the actuating devices and forming the coupling elements of said actuating devices. This is also advantageous for a very simple and reliable construction of the coupling device.

It has also proved to be advantageous if the control device has an inner portion, with which the control device is pivotable about the spindle, and a substantially sector-shaped peripheral portion, which is connected to the inner portion and which is coaxial with the spindle, and the two coupling elements of the control device are situated at the sector-shaped peripheral portion. This is advantageous for a stable construction and mounting of the control device.

Moreover, it has proved to be favorable if in an apparatus comprising a spindle for a rotatably drivable apparatus part for driving a record carrier, which spindle is mounted on the chassis, the control device is pivotable about the spindle for the rotatably drivable apparatus part. This is advantageous for a simple and compact construction.

BRIEF DESCRIPTION OF THE DRAWINGS

The invention will be described in more detail hereinafter with reference to the drawings, which show two exemplary embodiments to which the invention is not limited.

FIG. 1 shows substantially full-scale plan views of two pocket dictation machines forming two embodiments of recording and reproducing apparatuses in accordance with the invention, which are both adapted to receive a cassette accommodating a record carrier in the form of a tape, part A of FIG. 1 showing an elongate pocket dictation machine into which a cassette can be inserted with its longitudinal axis transverse to the longitudinal axis of the pocket dictation machine, and part B of FIG. 1 showing an elongate pocket dictation machine into which a cassette can be inserted with its longitudinal axis parallel to the longitudinal axis of the pocket dictation machine.

FIG. 2 is a partly diagrammatic plan view to a larger than full-size scale, showing a cassette suitable for use in the two pocket dictation machines shown in FIG. 1.

DETAILED DESCRIPTION OF THE PREFERRED EMBODIMENTS

Figure 3:
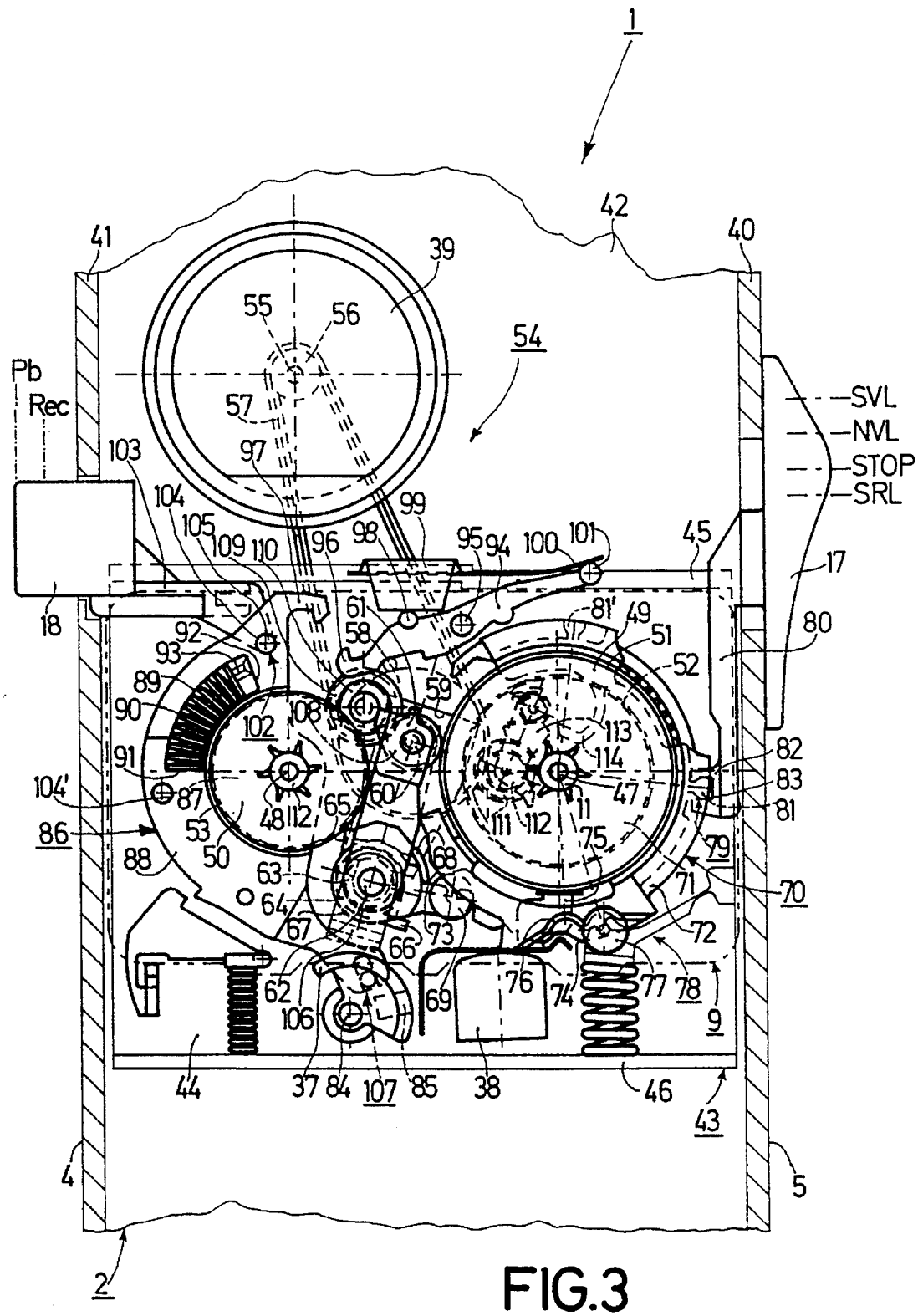
FIG. 3 shows a part of the pocket dictation machine in part A of FIG. 1 in a slightly simplified plan view, taken to a larger scale than FIG. 1 and with the upper part of the apparatus cut away, the shown part of the apparatus comprising two control devices for controlling the actuation of apparatus parts which are movably supported on a chassis of the apparatus.

It is to be noted that in the following description with reference to the Figures the reference numerals for similar or corresponding apparatus pans of the two pocket dictation machines shown in FIG. 1 are in principle the same. However, the reference numerals for apparatus parts of the pocket dictation machine shown in part B of FIG. 1 are primed.

In each of its two parts A and B, FIG. 1 shows a recording and reproducing apparatus 1, 1' constructed as a pocket dictation machine for recording and reproducing speech signals. Both apparatuses 1, 1' each have a narrow slender rectangular housing 2, 2'.

The apparatus 1 shown in part A of FIG. 1 has a cover 7, which is mounted so as to be slidable along the upper side 3 of the apparatus and which extends into both long narrow apparatus sides 4 and 5 and one short narrow apparatus side 6, for closing a cassette compartment 8 into which a cassette 9 as shown in FIG. 2 and accommodating a record carrier in the form of a magnetic tape can be inserted with its longitudinal axis transverse to the longitudinal axis of the apparatus 1.

The apparatus 1' shown in pan B of FIG. 1 has a cover 7', which is mounted on the upper side 3' of the apparatus so as to be pivotable about a pivotal axis 10' and which extends into a long narrow apparatus side 5', for closing a cassette compartment 8' into which a cassette 9 as shown in FIG. 2 and accommodating a record carrier in the form of a magnetic tape can be inserted with its longitudinal axis transverse to the longitudinal axis of the apparatus 1'.

FIG. 1 illustrates a situation in which there is no cassette in the cassette compartment 8, 8' of the relevant apparatus 1, 1'. A forward winding mandrel 11, 11' and a reverse winding mandrel 12, 12' project from the lower part of the apparatus into the cassette compartment 8, 8' and are visible through a transparent window 13, 13' of the cover 7, 7'. In its upper side 3, 3' the apparatus further has a diagrammatically shown pattern 14, 14' of sound transmission slots, behind which a built-in microphone, not shown, is disposed in the apparatus 1,1', and a diagrammatically shown pattern 15, 15' of sound transmission apertures behind which a built-in loudspeaker 16, 16' is disposed in the apparatus 1, 1'. At its right-hand long narrow side 5, 5' in FIG. 1 the apparatus 1, 1' has a slide button 17, 17' which is slidable in the longitudinal direction of this narrow side 5, 5' to start tape transport modes of the apparatus 1, 1'. The slide button 17, 17' can be moved to and fro by hand between four operating positions SRL, STOP, NVL and SVL, which four positions in succession correspond to the tape-transport modes "fast reverse", "stop", "normal forward" and "fast forward". At the left-hand long narrow side 4, 4' in FIG. 1 the apparatus 1, 1' has a push-button 18, 18', which can be set to two operating positions Pb and Rec, indicated diagrammatically in FIGS. 3 and 4, to start a reproducing mode of the apparatus 1, 1' in its operating position Pb and to start a recording mode of the apparatus 1, 1' in its operating position Rec.

As is shown in FIG. 1 the buttons 17, 18 and 17', 18' of both pocket dictation machines 1, 1' are arranged at the same locations on the relevant apparatus although the cassette 9 is inserted into the two apparatuses 1, 1' in two positions turned through 90° relative to one another and the two decks of the apparatuses 1, 1' consequently also occupy positions rotated through 90° relative to one another.

Figure 4:
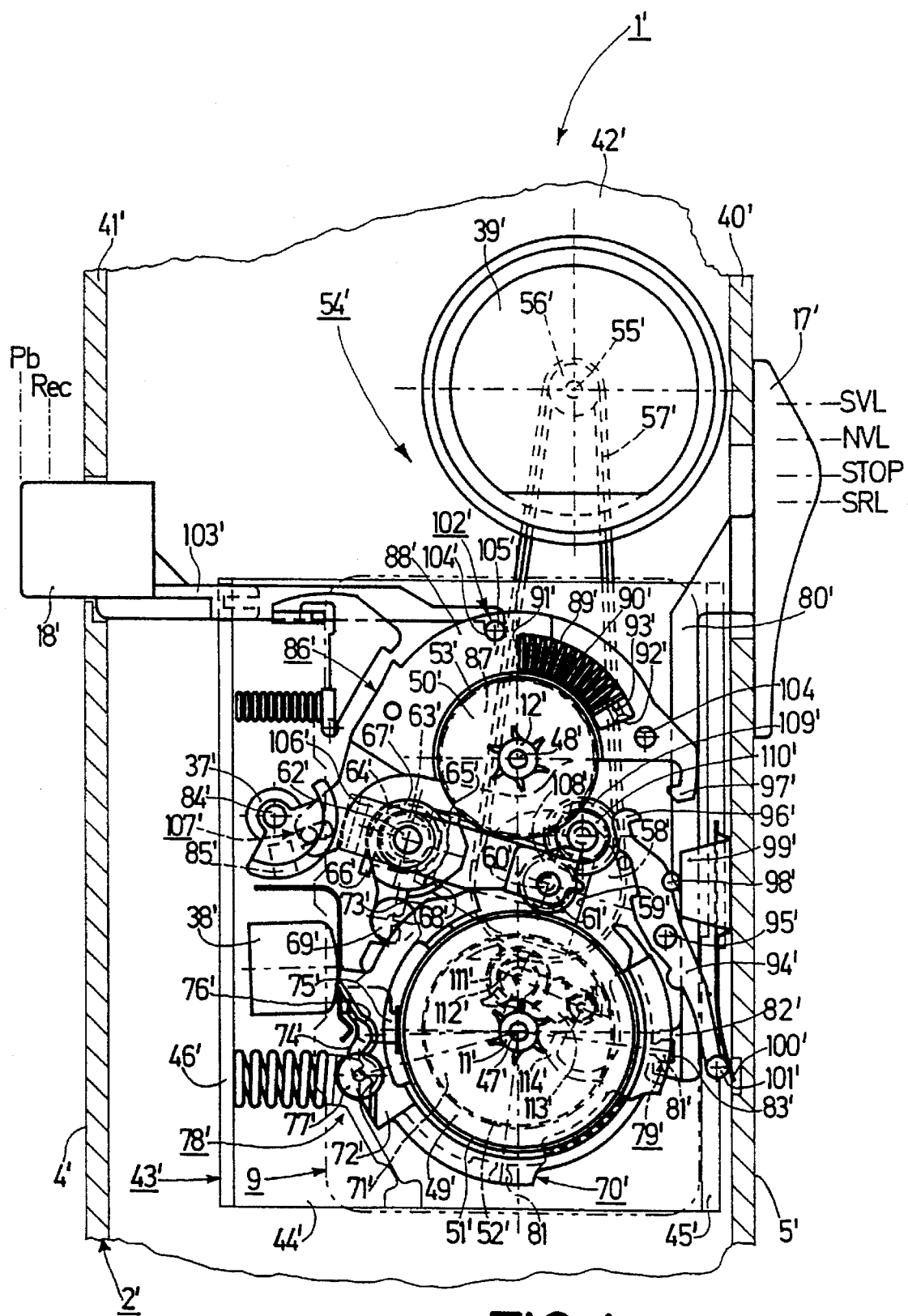
FIG. 4 shows in the same way as FIG. 3 a part of the apparatus shown in part B of FIG. 1.

The cassette 9 has a rectangular housing 19 comprising a first cassette main side 20, visible in FIG. 2, a second cassette main side 21, not visible in FIG. 2, a long narrow front side 22, a long narrow rear side 23, a short narrow left-hand side 24 as viewed in FIG. 2, and a short narrow right-hand side 25 as viewed in FIG. 2. For the storage of speech signals the cassette 9 accommodates a record carrier in the form of a magnetic tape 26, two juxtaposed rotatably drivable reel hubs 27 and 28 being rotatably mounted between the two cassette main sides 20 and 21 for taking up the magnetic tape 26. At its ends the magnetic tape 26 is attached to the reel hubs 27 and 28 and in the cassette 9 shown in FIG. 2 it has been wound completely onto the reel hub 27 to form a tape spool 29. The magnetic tape 26 extends from the spool 29 on the reel hub 27 to the other reel hub 28 via three cylindrical tape guides 30, 31 and 32. By means of the tape guides 30, 31 and 32 the magnetic tape 26 is guided along the long narrow front side 16 of the cassette, in which side two openings 33 and 34 are provided. At the location of the two openings 33 and 34 two pressure felts 35 and 36 are arranged so as to be movable in a manner not shown, by means of which felts the magnetic tape 26 can be pressed against the head faces of two magnetic heads 37, 37' and 38, 38' of the apparatus, which magnetic heads can be brought into scanning contact with the magnetic tape 26 through the two openings 33 and 34. The two magnetic heads 37, 37' and 38, 38', which are shown diagrammatically in FIGS. 3 and 4, are a magnetic erase head 37, 37' for erasing speech signals on the magnetic tape 26 and a magnetic recording and reproducing head 38, 38' for recording and reproducing speech signals on/from the magnetic tape 26.

The cassette 9 can be inserted into the apparatus 1, 1' in two mutually inverted positions, the winding mandrels 11, 11' and 12, 12' of the apparatus entering into driving engagement with the reel hubs 27 and 28 through one of the two cassette main sides 20 and 21 depending on the position of the cassette 9, so that with a cassette 9 present in the apparatus I, 1' each of the two winding mandrels 11, 11' and 12, 12' is in driving engagement with one of the reel hubs 27 and 28 in order to drive the magnetic tape 26. In all the tape-transport modes of each of the two apparatuses 1, 1' the magnetic tape 26 is driven in that only one of the two winding mandrels 11, 11' and 12, 12' is driven. The winding mandrels 11, 11' and 12, 12' are driven by a motor 39, 39', accommodated in the apparatus 1, 1' and shown diagrammatically in FIG. 1, via a drive means which is not shown in FIG. 1.

The part of the apparatus 1 in pan A of FIG. 1 and of the apparatus 1' in pan B of FIG. 1 which is relevant to the invention will be described with reference to FIGS. 3 and 4. An injection-moulder plastics chassis 43, 43' is mounted in the space between two long side walls 40, 40' and 41, 41', of which the side wall 40, 40' is situated at the long narrow side 5, 5' of the apparatus and the side wall 40, 41' at the long narrow side 4, 4' of the apparatus, and a bottom wall 42, 42' of the apparatus housing 2, 2', which chassis comprises a plate-shaped chassis part 4.4, 44' extending parallel to the bottom wall 42, 42' and two strip-shaped chassis parts 45, 45' and 46, 46' extending substantially perpendicularly to this plate-shaped chassis pan 44, 44'. Two spindles 47, 47' and 48, 48' are locked against rotation in the chassis pan 44, 44'. The forward winding mandrel 11, 11' is rotatably mounted on one spindle 47, 47' and the reverse winding mandrel 12, 12' is rotatably mounted on the other spindle 48, 48'. Each of the two winding mandrels 11, 11' and 12, 12' is locked in rotation to one of two drive wheels 49, 49' and 50, 50', which are coaxial with the two winding mandrels 11, 11' and 12, 12', in that each of the winding mandrels 11, 11' and 12, 12' is integral with the respective drive wheels 49, 49' and 50, 50'. The forward drive wheel 49, 49', which is integral with the forward winding mandrel 11, 11', is cup-shaped and it has a friction-wheel portion 51, 51' formed by a rubber ting at its outer circumference, and a toothed-wheel portion 52, 52' at its inner circumference. The reverse drive wheel 50, 50', which is integral with the reverse winding mandrel 12, 12', is a/so cup-shaped and at its outer circumference it has a toothed-wheel portion 53, 53' formed by spur teeth.

The apparatus 1, 1' has a drive means 54, 54' for driving the forward drive wheel 49, 49' in the "normal forward" mode and the "fast forward" mode and for driving the reverse drive wheel 50, 50' in the "fast reverse" mode. The drive means 54, 54' includes the motor 39, 39', which is secured to the bottom wall 42, 42' of the apparatus housing 2, 2' and whose motor shaft 55, 55' carries a pulley 56, 56'. A belt 57, 57' runs over the pulley 56, 56' and over a further pulley 58, 58', which also forms a flywheel. The further pulley 58, 58' is situated underneath the chassis part 44, 44' and is coaxially connected and locked in rotation to a drive shaft 60, 60' which projects through an opening 59, 59' in the chassis part 44, 44', is situated essentially in an area between the two drive wheels 49, 49 and 50, 50', is movable into different operating positions, and can thus be rotated by the motor 39, 39' via the belt 57, 57' and the further pulley 58, 58'.

The drive shaft 60, 60' is rotatably supported by means of a substantially H-shaped bearing block 61, 61', which bearing block is mounted so as to be pivotable about a spindle 62, 62' and is movable between different operating position. The spindle 62, 62' is mounted in an L-shaped support 106, 106' connected to the chassis 43, 43', from which it projects towards the chassis part 44, 44'.

A sleeve 63, 63' is mounted on the spindle 62, 62', on which sleeve a leg spring 64, 64' is fitted, which acts on the bearing block 61, 61' with one leg 65, 65' and on an actuating lever 67, 67' with the other leg 66, 66', which actuating lever is movably supported on the sleeve. The actuating lever 67, 67' has an arcuate projection 68, 68', with which it is supported on the bearing block 61, 61'. At its free end the actuating lever 67, 67' carries an actuating roller 69, 69'.

A portion of the drive shaft 60, 60' of the drive means 54, 54' serves as a friction-wheel drive, this portion of the drive shaft being engageable against the rubber ring 51, 51' of the forward drive wheel 49, 49' by a corresponding movement of the bearing block 61, 61' to drive the forward drive wheel 49, 49' in a "normal forward" mode. A pinion 108, 108' of the drive means 54, 54' is coaxially mounted on the drive shaft 60, 60'. In a "fast reverse" mode this pinion 108, 108' can be meshed with a toothed wheel 109, 109', which is rotatably supported on the chassis part 44, 44', by a corresponding movement of the bearing block 61, 61', which toothed wheel is coaxial with and locked in rotation to a further toothed wheel 110, 110', which is constantly in mesh with the teeth 53, 53' of the reverse drive wheel 50, 50'. In the "fast reverse" mode the reverse drive wheel 50, 50' can be rotated by the pinions 108, 108' via the two toothed wheels 109, 109' and 110, 110' of the drive means 54, 54'. In a "fast forward" mode the pinion 108, 108' can be meshed with a toothed wheel 111, 111' by a suitable movement of the bearing block 61, 61', which toothed wheel is coaxial with and locked in rotation to a further toothed wheel 112, 112', which can mesh with the toothed portion 52, 52' of the forward drive wheel 49, 49'. The two coaxial toothed wheels 111,111' and 112, 112' are rotatably supported on a supporting lever 113, 113', which is pivotably supported on the chassis pan 44, 44'. The two coaxial toothed wheels 111, 111' and 112, 112' can be moved into a fast-forward driving position by moving the supporting lever 113, 113', in which position the one toothed wheel 112, 112' is in mesh with the toothed-wheel portion 52, 52' of the forward drive wheel 49, 49' and the other toothed wheel 111,111' with the pinion 108, 108', so that the pinion 108, 108' van drive the forward drive wheel 49, 49' in the "fast forward" mode via the toothed wheels 111, 111' and 112, 112'.

To control the movement of the actuating roller 69, 69' and the actuating lever 67, 67' and, consequently, that of the bearing block 61, 61' together with the drive shaft 60, 60' and its coaxial pinions 108, 108', and also to control the movement of further parts of the apparatus 1, 1', such as the supporting lever 113, 113' together with the toothed wheels 111, 111' and 112, 112', the apparatus 1, 1' has a control device 70, 70'. The control device 70, 70' is pivotable about the spindle 47, 47', which rotatably supports the forward winding mandrel 11, 11' and the forward drive wheel 49, 49'. The control device 70, 70' has a substantially sector-shaped inner portion 71, 71' with which the control device 70, 70' is pivotable about the spindle 47, 47'. The control device 70, 70' has a substantially sector-shaped peripheral portion 72, 72', which is connected to the inner portion 71, 71' and which is coaxial with the spindle 47, 47'. At its peripheral portion 72, 72' the control device 70, 70' has a first control cam 73, 73' for controlling the movement of the actuating roller 69, 69'. The control device 70, 70' further has a second control cam 74, 74' for controlling the movement of a braking device 75, 75' for the forward drive wheel 49, 49'. The control device 70, 70' further comprises a resilient arm 114, 114' which projects inwardly from the peripheral portion 72, 72' and which serves to cooperate with the supporting lever 113, 113' which rotatably supports the two toothed wheels 111, 111' and 112, 112'. By means of the arm 114, 114' the supporting lever 113, 113' is movable in such a manner that the two toothed wheels 111,111' and 112, 112' are pivoted into their fast-forward driving positions. At its peripheral portion 72, 72' the control device 70, 70' further comprises a latching cam 76, 76', which cooperates with a latching device 78, 78' comprising a latching roller 77, 77'.

It is to be noted here that a control device 70, 70' as used in the apparatuses 1, 1' and a drive means 54, 54' as used in the apparatuses 1, 1' are described in detail in U.S. application Ser. No. 161,954 filed Dec. 2, 1993 herewith incorporated by reference.

The control device 70, 70' is coupled to a movable actuating device 80, 80' via a coupling device 79, 79', which actuating device is adapted to be coupled to the control device 70, 70' via the coupling device in a given position relative to the chassis 43, 43' and the apparatus parts mounted on this chassis and is connected to the hand-actuated slide button 17, 17' of the apparatus 1, 1' situated outside the apparatus housing 2, 2', the coupling device 79, 79' having a coupling element on the control device 70, 70' and on the actuating device 80, 80'. In the present case the coupling device 79, 79' is formed by a pin-and-slot joint comprising a pin 81, 81' projecting from the peripheral portion 72, 72' of the control device 70, 70', and a slot 83, 83' formed in a lateral projection 82, 82' of the actuating device 80, 80'. The actuating device 80, 80' is constructed as a slider, which is guided to be movable parallel to the side wall 40, 40' of the apparatus housing 2, 2'.

As already stated, the apparatus 1, 1' comprises a recording/playback head 38, 38', which is fixedly secured to the chassis 44, 44', and an erase head 37, 37', which is pivotably mounted on the chassis 44, 44'. The magnetic head 37, 37' is constructed as a so-called permanent-magnet erase head and is pivotable about a spindle 84, 84' on the chassis 44, 44'. The erase head 37, 37' comprises a permanent magnet 85, 85', which can be pivoted anti-clockwise, as viewed in FIGS. 3 and 4, from an non-operational position shown in FIGS. 3 and 4 into an operational position in which the permanent magnet 85, 85' is in contact with the magnetic tape 26 in the cassette 9, so that previously recorded signals on the magnetic tape 26 are erased by the permanent magnet 85, 85' as the magnetic tape 26 is moved. Such an erasure of previously recorded signals is effected in the "recording" mede of the apparatus 1, 1', for which reason the permanent magnet 85, 85' of the erase head 37, 37' is pivoted into its operational position when the apparatus 1, 1' is set to the "recording" mode.

To control the actuation of the erase head 37, 37' and to control the actuation of a recording/reproducing switch, not shown, the apparatus 1, 1' has a further control device 86, 86'. The control device 86, 86', in the same way as the control device 70, 70', has a substantially sector-shaped inner portion 87, 87' with which the control device 86, 86' is pivotable about the spindle 48, 48' by means of which the winding mandrel 12, 12' and the reverse drive wheel 50, 50' are rotatably supported. The control device 86, 86' further has a substantially sector-shaped peripheral portion 88, 88', which is connected to the inner portion 87, 87' and which is coaxial with the spindle 48, 48'. The control device 86, 86' has an arcuate recess 89, 89' in which a pressure spring 90, 90' is arranged, which at one end bears against one end 91, 91' of the recess 89, 89' and which at the other end bears against a stop 93, 93' which projects perpendicularly from the chassis part 44, 44' of the chassis 43, 43' into the recess 89, 89' at the location of the other end 92, 92' of this recess 89, 89'. As shown in FIGS. 3 and 4, the pressure spring 90, 90' urges the control device 86, 86' in the anti-clockwise direction, which in the situation illustrated in FIGS. 3 and 4 results in the end 92, 92' of the recess 89, 89' in the control device 86, 86' abutting against the stop 93, 93', thereby defining the position of the control device 86, 86' in this situation. In this position of the control device 86, 86' the apparatus 1, 1' is in the "reproducing" mode. In this position of the control device 86, 86' the erase head 37, 37', which is coupled to the control device 86, 86' via a pin-and-slot joint 107, 107', is held in its non-operational position.

By actuation of the push-button 18, 18' the control device 86, 86' can be pivoted clockwise from the position shown in FIGS. 3 and 4 into a further position, in which the apparatus 1, 1' is in the "recording mode" and in which the control device 86, 86' can be latched by means of a latching lever 94, 94', the erase head 37, 37' being held in its operational position via the pin-and-slot joint 107, 107'. The latching lever 94, 94' is pivotable relative to the chassis 43, 43' about a spindle 95, 95' and has a latching hook 96, 96' at one end, which hook is adapted to cooperate with another hook 97, 97' provided on the control device 86, 86'. The latching lever 94, 94' can be held in a release position via a pin 98, 98' on this lever by means of a substantially U-shaped blade-spring device 99, 99' which is supported on the chassis 43, 43'. When a cassette 9 is inserted into the apparatus 1, 1' the latching lever 94, 94', i.e. its pin 98, 98', moves the blade-spring device 99, 99' so far away that the latching lever 94, 94' can be moved into its latching position under the influence of the force of a laterally projecting additional spring arm 100, 100' of the blade-spring device 99, 99', which acts on a further pin 101, 101' on the latching lever 94, 94'.

It is to be noted here that a control device 86, 86' as used in the apparatus 1, 1' shown in FIGS. 3 and 4 and a latching device with a latching lever 94, 94' and a blade-spring device 99, 99' for this control device 86, 86' are described in detail in U.S. Pat. No. 5,373,405, herewith incorporated by reference.

The control device 86, 86' is coupled to a movable actuating device 103, 103' via a coupling device 102, 102'. The actuating device is adapted to be coupled to the control device 86, 86' via the coupling device 102, 102' in a given position relative to the chassis 43, 43'. The actuating device apparatus pans mounted on this chassis and is connected to the hand-actuated push-button 18, 18' of the apparatus 1, 1' which is situated at least partly outside the apparatus housing 2, 2'. The coupling device 102, 102' has a coupling element on the control device 86, 86' and on the actuating device 103, 103'. The coupling device 102, 102' is formed by a pin-and-hole joint. The coupling device 102, 102' now comprises a hole 104, 104' formed in the control device 86, 86' and engaged by a pin 105, 105' projecting from the actuating device 103, 103'. The actuating device 103, 103', similarly to the actuating device 80, 80', is formed by a slider which is movably guided on the chassis 43, 43'.

In an advantageous manner each of the two control devices 70, 70' and 86, 86' has two coupling elements which are spaced 90° apart relative to the spindle 47, 47' and 48, 48', respectively. For this purpose the control device 70, 70' has not only a pin 81, 81' projecting from its peripheral portion 72, 72' but also a second pin 81', 81, which is 90° spaced from the pin 81, 81 '. Moreover, the control device 86, 86' has for this purpose not only a hole 104, 104' but also a second hole 104', 104, which is 90° spaced from the hole 104, 104'. As is apparent from FIGS. 3 and 4, each coupling element 81, 81' of the control device 70, 70' and each coupling element 104, 104' of the control device 86, 86' is engageable with a respective coupling element 83, 83' and 105, 105' of one of two actuating devices 80, 80' and 103, 103', of which a respective actuating device 80 or 103 can be coupled to the respective control device 70, 86 or 70', 86' in a given position relative to the chassis 43 and the apparatus parts on the chassis 43, and the other actuating device 80' or 103' can be coupled to the respective control device in a position relative to the chassis 43' and the apparatus parts on this chassis 43' which has been rotated through 90° relative to this given position.

In this way it is achieved by very simple means and hardly without additional costs that one and the same chassis together with the apparatus parts arranged on it can be built into an apparatus housing in two positions rotated through an angle of 90° relative to one another in order to realize two variants of the apparatus which differ from one another with respect to the position of the chassis and the apparatus parts mounted thereon, and that in spite of the different apparatus variants the actuating members for starting the modes of operation of the apparatus are disposed on the respective apparatus housings at substantially the same ergonomically advantageous locations, the actuating members being coupled to the control device of the relevant apparatus via a coupling device by means of actuating devices which differ slightly depending on the apparatus variant.

The invention is not limited to the exemplary embodiments described above. For example, the coupling elements of the control devices of an apparatus may be spaced apart at an angle which differs from 90" if this is required for the construction of apparatus variants in which a chassis with the apparatus parts carried by this chassis should be built into the apparatus housing in two positions which are spaced apart at an angle which differs from 90'". Moreover, the control devices may be of another construction than in the two apparatus variants described above and instead of substantially sector-shaped the control devices may have angular shapes. Furthermore, the actuating devices need not be guided so as to be slidable but they may also be arranged so as to be pivotable. The coupling devices may also be of a different construction and may be formed by, for example, hinged coupling levers or toothed segment-and-rack couplings. The steps in accordance with the invention can be used not only in recording and reproducing apparatuses for recording and reproducing signals on/from a magnetic tape accommodated in a cassette but also in apparatuses for optically or magnetically scanned record carders or other apparatuses for record carriers of other kinds.

I claim:

1. A recording and/or reproducing apparatus, comprising:
   a) an apparatus housing,
   b) a chassis arranged inside the apparatus housing and including spindle, a movable part arranged on the chassis so as to be movable, a control device for controlling the movement the movable part, said control device being mounted so as to be pivotable about said spindle between at least two operating positions relative to the chassis, and a movable actuating device, the actuating device being coupleable to the control device in a given position relative to the chassis, and
   c) a hand-actuated actuating member disposed partly outside the apparatus housing and connected to the actuating device, and
   d) a coupling device coupling the control device and the actuating device the control device comprises two coupling elements which are spaced apart by a given angle relative to the spindle, and the actuating device being engagable with one of said coupling elements of the control device in said one given position relative to the chassis and with the other said coupling element in a position rotated through the given angle with respect to the given position relative to the chassis.

2. An apparatus as claimed in claim 1, characterized in that the two coupling elements of the control device are spaced apart at substantially 90° relative to the spindle.

3. An apparatus as claimed in claim 2, characterized in that the control device has an inner portion with which the control device is pivotable about the spindle, and a substantially sector-shaped peripheral-portion connected to the inner portion and coaxial with the spindle, and the two coupling elements of the control device are situated at the sector-shaped peripheral portion.

4. An apparatus as claimed in claim 2, characterized in that the chassis comprises a pair of spindles one of which drives an apparatus part for rotating a record carrier, and the control device is pivotable about said one spindle.

5. An apparatus as claimed in claim 2, characterized in that the coupling elements of the control device are apertures in the control device, and the actuating device includes a pin projecting therefrom and engaging in a said aperture.

6. An apparatus as claimed in claim 5, characterized in that the control device has an inner portion with which the control device is pivotable about the spindle, and a substantially sector-shaped peripheral portion connected to the inner portion and coaxial with the spindle, and the two coupling elements of the control device are situated at the sector-shaped peripheral portion.

7. An apparatus as claimed in claim 6, characterized in that the chassis comprises a pair of spindles one of Which drives an apparatus part for rotating a record carrier, and the control device is pivotable about said one spindle.

8. An apparatus as claimed in claim 5, characterized in that the chassis comprises a pair of spindles one of which drives an apparatus part for rotating a record carrier, and the control device is pivotable about said one spindle.

9. An apparatus as claimed in claim 2, characterized in that the coupling elements of the control device are pins which project from said control device, and the actuating device includes apertures for receiving said pins.

10. An apparatus as claimed in claim 9, characterized in that the control device has an inner portion with which the control device is pivotable about the spindles, and a substantially sector-shaped peripheral portion connected to the inner portion and coaxial with said spindle, and the two coupling elements of the control device are situated at the sector-shaped peripheral portion.

11. An apparatus as claimed in claim 10, characterized in that said chassis comprises a pair of spindles, one of which drives an apparatus part for driving a record carrier, and the control device is pivotable about said one spindle.

12. An apparatus as claimed in claim 9, characterized in that the chassis comprises a pair of spindles one of which drives an apparatus part for rotating a record carrier, and the control device is pivotable about said one spindle.

13. An apparatus as claimed in claim 1, characterized in that the coupling elements of the control device are apertures in the control device, and the actuating device includes pins projecting therefrom and engagable in said apertures in the control device and forming the coupling elements of said actuating device.

14. An apparatus as claimed in claim 13, characterized in that the control device has an inner portion with which the control device is pivotable about the spindle, and a substantially sector-shaped peripheral portion connected to the inner portion and coaxial with the spindle, and the two coupling elements of the control device are situated at the sector-shaped peripheral portion.

15. An apparatus as claimed in claim 14, characterized in that the chassis comprises a pair of spindles on of which drives an apparatus part for rotating a record carrier, and the control device is pivotable about said one spindle.

16. An apparatus as claimed in claim 13, characterized in that the chassis comprises a pair of spindles one of which drives an apparatus part for rotating a record carrier, and the control device is pivotable about said one spindle.

17. An apparatus as claimed in claim 1, characterized in that the coupling elements of the control device are pins which project from said control device and the coupling elements of the actuating devices are apertures for receiving said pins.

18. An apparatus as claimed in claim 17, characterized in that the control device has an inner portion; with which the control device is pivotable about the spindle, and a substantially sector-shaped peripheral portion connected to the inner portion and coaxial with the spindle, and the two coupling elements of the control device are situated at the sector-shaped peripheral portion.

19. An apparatus as claimed in claim 18, characterized in that the chassis comprises a pair of spindles one of which drives an apparatus part for rotating a record carrier, and the control device is pivotable about said one spindle.

20. An apparatus as claimed in claim 17, characterized in that the chassis comprises a pair of spindles one of which drives an apparatus part for rotating a record carrier, and the control device is pivotable about said one spindle.

21. An apparatus as claimed in claim 1, characterized in that the control device has an inner portion with which the control device is pivotable about the spindle, and a substantially sector-shaped peripheral portion connected to the inner portion and coaxial with the spindle, and the two coupling elements of the control device are situated at the sector-shaped peripheral portion.

22. An apparatus as claimed in claim 1, characterized in that the chassis comprises a pair of spindles one of which drives an apparatus part for rotating a record carrier, and the control device is pivotable about said one spindle.

23. A dictating machine, comprising:

a) a housing having an interior and an exterior;

b) a chassis arrangeable in the interior of the housing in a first and a second, different orientation, said chassis being arranged in the interior of the housing in one of said first and second orientations, said chassis including a movable part arranged on the chassis so as to be movable, and a control device for controlling the movement of the moveable part, the control device being moveable between at least two control positions relative to said chassis;

c) a control member movably mounted on said housing and accessible from the exterior of said housing, said control member being moveable between first and second control member positions relative to said housing; and d) coupling means, comprising first and second spaced coupling elements on said control device, for coupling said control member to said control device on said chassis, said spaced coupling elements being arranged on said control device such that: (i) said first coupling element is coupleable to said control member when said chassis is arranged in said first orientation and said second coupling element is coupleable to said control member when said chassis is arranged in said second orientation, and (ii) said control device is moved to the same respective control position for each control member position when said control member is coupled to said control device with the respective coupling element in either of said first and second orientations of said chassis in said housing.

24. A dictating machine according to claim 23, wherein said coupling means further comprises an actuating element for connecting said control member to either of said first and second coupling elements of said control device, and said actuating element couples said control member to the respective coupling element for one of said chassis orientations.

25. A dictating machine according to claim 23, further comprising a second control device, a second control member, and a second coupling means, and said spaced coupling elements of said second control device being arranged on said second control device such that: (i) said first coupling element of said second control device is coupleable to said second control member when said chassis is arranged in said first orientation and said second coupling element of said second control device is coupleable to said control member when said chassis is arranged in said second orientation, and (ii) said second control device is moved to the same respective control position for each position of said second control member when said second control member is coupled to said second control device with the respective coupling element of said second control device in either of said first and second chassis orientations.

26. A dictating machine according to claim 25, wherein said first and second control devices are each pivotable between the respective said control positions of said control devices.

27. A dictating machine chassis for use with first and second similar dictating machine housings having similarly situated control members, the control members being movably mounted on the housings and accessible from the exterior of the housings, each control member being moveable between first and second control member positions, said chassis comprising:

a) a chassis base arrangeable in the interior of the first housing in a first orientation and in the second housing in a second, different orientation relative to the respective control member, said chassis base including a movable part arranged on the chassis base so as to be movable, and a control device for controlling the movement of the moveable part, the control device being moveable between at least two control positions on the chassis; and b) coupling means, comprising first and second spaced coupling elements on said control device, for coupling the respective control member of each housing to said control device on said chassis, said spaced coupling elements being arranged on said control device such that: (i) said first coupling element is coupleable to the control member of the first housing when said chassis is arranged in said first orientation in the first housing and said second coupling element is coupleable to the control member of the second housing when said chassis is arranged in the second orientation in the second housing, and (ii) said control device is moved to the same respective control position for each position of the respective control member when the respective control member is coupled to said control device with the respective coupling element in either of said first and second chassis orientations.

28. A dictating machine chassis according to claim 27, wherein said coupling means further comprises an actuating element for connecting either of said coupling elements of said control device to the respective control member on each of the first and second housings.

29. A dictating machine chassis according to claim 27, wherein the first and second housings further include a second control member, and said chassis further comprises a second control device and a second coupling means, and said first and second spaced coupling elements on said second control device are positioned on said second control device such that: (i) said first coupling element of said second control device is coupleable to the second control member of the first housing when said chassis is arranged in the first orientation in the first housing and said second coupling element of said second control device is coupleable to the control member of the second housing when said chassis is arranged in the second orientation in the second housing, and (ii) the second control device is moved to the same respective control position for each position of the respective second control member when the respective second control member is coupled to said control device with the respective coupling element in either of said first and second chassis orientations.

30. A dictating machine according to claim 29, wherein said first and second control devices are each pivotable between the respective said control positions of said control devices.

* * * * *